Figure 1:
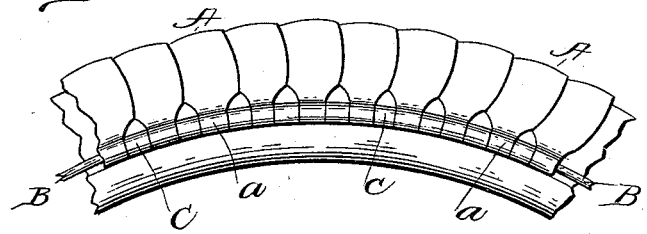

No. 639,846. Patented Dec. 26, 1899.
J. COAN.
PNEUMATIC TIRE FENDER.
(Application filed Apr. 21, 1899.)

(No Model.)

Witnesses
Inventor
John Coan
by A. B. Willson & Co.
Attorneys

UNITED STATES PATENT OFFICE.

JOHN COAN, OF KANSAS CITY, MISSOURI.

PNEUMATIC-TIRE FENDER.

SPECIFICATION forming part of Letters Patent No. 639,846, dated December 26, 1899.

Application filed April 21, 1899. Serial No. 713,895. (No model.)

*To all whom it may concern:*

Be it known that I, JOHN COAN, a citizen of the United States, residing at Kansas City, in the county of Jackson and State of Missouri, have invented certain new and useful Improvements in Pneumatic-Tire Fenders; and I do declare the following to be a full, clear, and exact description of the invention, such as will enable others skilled in the art to which it appertains to make and use the same.

My invention relates to a rubber-tire fender; and the object is to provide a simple, inexpensive, and effective device for this purpose.

To this end the invention consists of a series of curved overlapping sheet-metal shields or scales formed with retaining-eyes and adapted to encompass the tread of the tire to prevent punctures.

The invention further consists in the construction, combination, and arrangement of the device, as will be hereinafter more fully described, and particularly pointed out in the claim.

In the accompanying drawings the same reference characters indicate the same parts of the invention.

Figure 2:
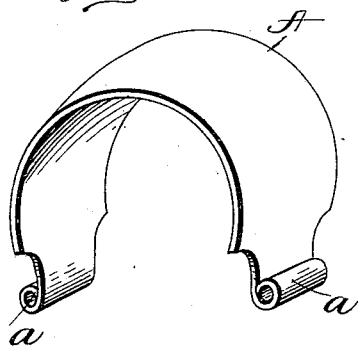
Figure 3:
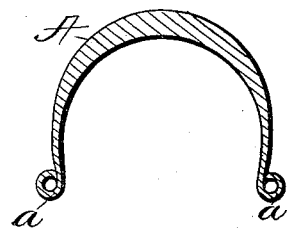
Figure 4:
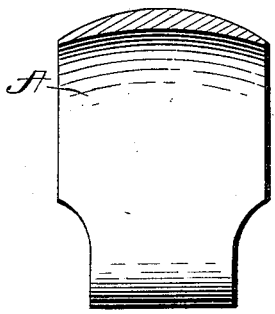

Figure 1 is a side elevation of a section of a pneumatic tire with my improved fender in position. Fig. 2 is a perspective view of one of the shields detached from the tire. Fig. 3 is a transverse section of the same. Fig. 4 is a longitudinal section of the same.

The fender proper consists of a series of counterpart overlapping scales or shields A A, the sides of which terminate in parallel eyes *a a*, which when the shields are assembled on the tire, as shown, are approximately alined with the corresponding eyes on the contiguous shields, so as to receive a retaining-wire B, on which is strung the metal sleeves C, which alternate with the eyes on the sides of the shields. As shown in the section views in Figs. 3 and 4, the shield is thickest in its central part, where the wear comes, and it tapers in all directions to the outer edges. These shields may be made of any suitable sheet metal, but preferably of spring-steel, suitably tempered, and a fender thus constructed renders the tire puncture-proof and is in itself practicably indestructible.

The accompanying drawings show my invention in the best form now known to me; but many changes in the details might be made within the skill of a good mechanic without departing from the spirit of my invention as set forth in the claim at the end of this specification.

Having thus fully described my invention, what I claim as new, and desire to secure by Letters Patent, is—

A pneumatic-tire fender or guard, comprising a continuous series of counterpart overlapping shields, having eyes formed in their reduced ends, the intervening sleeves and the retaining-wire extending through said alined eyes and sleeves, substantially as and for the purpose set forth.

In testimony whereof I have hereunto set my hand in presence of two subscribing witnesses.

JOHN COAN.

Witnesses:
J. V. COWLES,
H. A. BAILEY.